July 27, 1954  R. J. MOLUDY  2,684,858
STEERING GEAR FOR DOLLIES
Original Filed Dec. 29, 1947
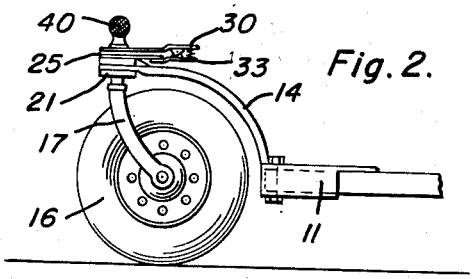
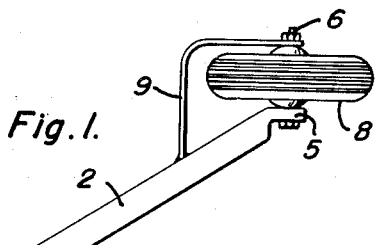
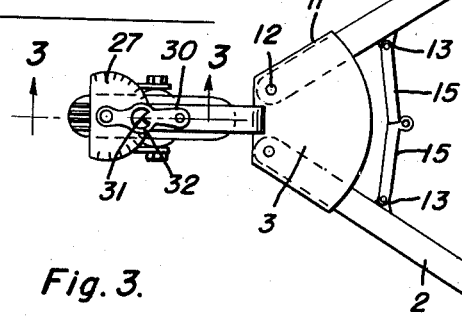
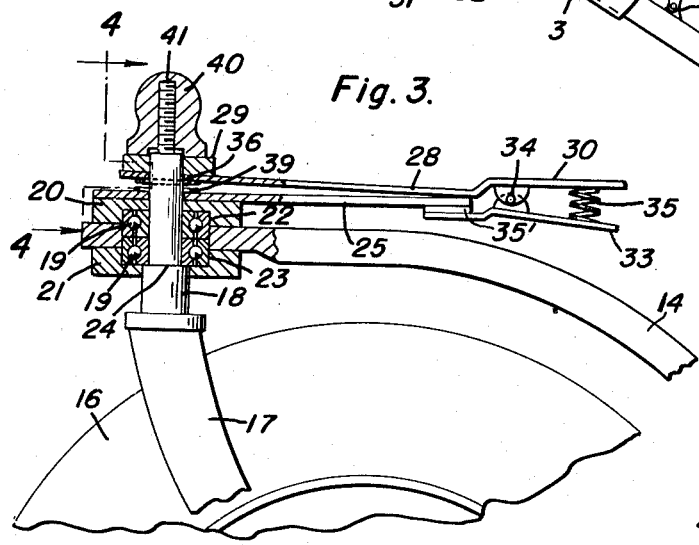
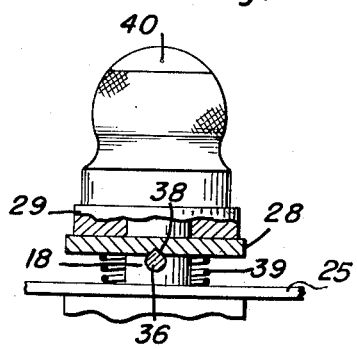
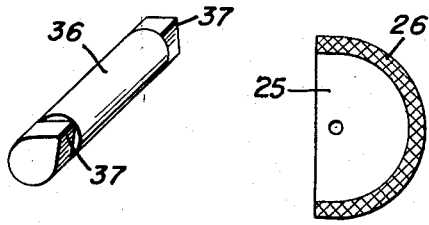
Rudolph Joseph Moludy
INVENTOR.

Patented July 27, 1954

2,684,858

UNITED STATES PATENT OFFICE 2,684,858

STEERING GEAR FOR DOLLIES

Rudolph Joseph Moludy, Akron, Ohio

Original application December 29, 1947, Serial No. 794,301. Divided and this application July 18, 1952, Serial No. 299,525

2 Claims. (Cl. 280—47.11)

My invention relates to improvements in steering gear for dollies of the tricycle, front steering wheel type forming the subject matter of my copending application Serial No. 794,301, filed December 29, 1947, and since issued as Patent No. 2,613,083, and of which the instant application is a division.

The primary object of my invention is to provide a steering gear for the front wheel of such a dolly including a steering arm and clutch means whereby the steering arm may be operatively connected to the steering wheel for steering purposes or disconnected therefrom to permit steering by manipulation of the dolly.

Another object is to provide steering gear for the steering wheel including means for setting the steering arm to set the steering wheel into different positions so that the dolly will be steered in a straight or curved course, selectively.

Still another object is to provide steering gear for the above purposes which is easy to operate, not liable to get out of order, and inexpensive to manufacture.

Other and subordinate objects, within the purview of my invention, together with the precise nature of my improvements will be readily understood when the succeeding description and claims are read with reference to the drawing accompanying and forming part of this specification.

In said drawing:

Figure 1 is a view in plan illustrating my improved steering gear applied to the dolly;

Figure 2 is a fragmentary view in side elevation;

Figure 3 is a fragmentary view in vertical longitudinal section taken on the line 3—3 of Figure 1 and drawn to a larger scale;

Figure 4 is a view in vertical section taken on the line 4—4 of Figure 3 and drawn to a larger scale;

Figure 5 is a view in perspective of the clutch pin drawn to a larger scale, and Figure 6 is a view in bottom plan of the sector plate drawn to a larger scale.

Referring to the drawing by numerals, the dolly for which my improved mechanism is especially designed comprises a pair of side frame bars 2 having spindles 6 on rear ends 5 thereof on which are suitably mounted rear wheels 8 straddled by fender bars 9 attached to the side bars 2 and spindles 6. The dolly is of the folding type and for that purpose the side bars 2 are pivoted, at at 12, at the front ends thereof to a saddle plate 3 for horizontal swinging from side by side folded position, not shown, into divergent relation against flanges 11 on said plate 3, said bars having pivoted thereto, as at 13, elbow jointed links 15 for maintaining said side bars in divergent relation, all of which need merely be mentioned in passing.

A caster type front steering wheel 16 for the dolly has its forks 17 provided with an upstanding spindle 18 journaled in ball bearings, as at 19, set into the front end of a fork carrying bar 14 arching upwardly and forwardly from the saddle plate 3, the ball bearings 19 being set into the front end of said bar 4 and retained therein by a pair of upper and lower collars 20, 21 suitably secured to the top and bottom of said bar 4 and recessed, as at 22, 23 to seat said bearings 19 therein. A shoulder 24 on the spindle 18 prevents upward end play of said spindle in said bearings 19.

A sector plate 25 extends horizontally rearwardly from the upper collar 20 and is suitably fixed on top thereof with the spindle 18 extending therethrough, said sector plate having its curved edge roughened on the bottom, as at 26, and graduated on top, as at 27, all for a purpose presently seen.

The steering wheel 16 is adapted to be turned at will, and/or set into different angular positions by means now to be described.

A steering arm 28 is rotatably and slidably mounted at its front end on the spindle 18 to extend rearwardly above the sector plate 25 and be swung sidewise, with a collar 29 thereon loosely engaging said spindle 18, said arm having a rear hand grip 30. A pointer finger 31 visible through an opening 32 in said arm 28 is adapted to register with a selected graduation 27 on the sector plate 35. A detent bar 33 is pivoted, as at 34, to the hand grip 30 in underlying relation thereto and tensioned by a suitable coil spring 35 to frictionally grip the roughened edge 26 of the sector plate 25 and thereby frictionally lock the steering arm 28 to said sector plate. Friction gripping material 35' may be provided on the detent bar 33 for engaging the roughened edge 26 of the sector plate 25. By squeezing the detent bar 33 toward the hand grip 30, the steering arm 28 may be released from the sector plate 25 for swinging at will, as will be clear.

Clutch means is provided between the steering arm 28 and the spindle 18 and which will now be described. A clutch pin 36 best shown in Figure 5, with upturned knife edge, ends 37 extends through and is fixed diametrically in the spindle 18 directly below the front end of the steering arm 28 with said ends 37 thereof adapted to seat upwardly in V-shaped clutch grooves 38 formed in the bottom of the steering arm 28 to form with said pin an engaged clutch between the spindle 18 and the steering arm 28. A coil spring 39 surrounding the spindle 18 between the steering arm 28 and the sector plate 25 urges said arm upwardly, at its front end, to unseat the clutch pin 36 and disengage the clutch. A knurled hand grip knob 40 is threaded onto a reduced upper end 41 of the spindle 18 to be screwed down thereon against the collar 29 and move the front end of the steering arm 28 downwardly, in opposition to the coil spring 29 to thereby seat the clutch pin 36 in the clutch grooves 38 and engage the described clutch.

As will now be seen, with the hand grip knob 40 threaded down on the portion 41 of the spindle 18 the clutch pin will be seated in the clutch grooves 38 so that the steering arm 28 will be clutched to said spindle 18. Now, by grasping the hand grip 30 and squeezing on the detent bar 33, said arm 28 may be swung to steer the dolly freely, or to set the steering wheel 16 at a desired angle, as selected by registration of the pointer finger 31 with a selected graduation 27 on the sector plate 25, in which setting said wheel may be retained by releasing the detent bar 33 for friction locking with the sector plate 25 in the manner already described. On the other hand, by loosening the hand grip knob 40, the clutch pin 36 may be unseated, in the manner already described, so that the spindle 18 is freed and the dolly may be pushed along, or around, with the caster wheel 16 turning freely for steering of the dolly according to manipulation of the same by the operator.

The foregoing will, it is believed, suffice to impart a clear understanding of my invention, without further explanation.

Manifestly, the invention, as described, is susceptible of modification, without departing from the inventive concept, and right is herein reserved to such modifications, as fall within the scope of the appended claims.

Having described the invention, what is claimed as new is:

1. In a dolly, a frame, a caster steering wheel having a fork with a spindle extending upwardly through said frame and rotatable therein, a graduated sector plate fixed on said frame and through which said spindle extends, a steering arm swingable over said plate to rotate said spindle and set said wheel at different angles in correspondence with graduations on said plate, said arm having an end in which said spindle is freely rotatable to free said wheel for caster action, said end being slidable on said spindle, clutch means for connecting said arm to said spindle means and is connecting the same, respectively, for setting of said wheel by said arm and permitting caster action of said wheel, selectively, comprising a clutch pin extending through said spindle, clutch grooves in said end of said arm for seating said pin when said end of the arm is slid in one direction, spring means opposing such sliding of said end of the arm, and a rotary member on said spindle for sliding said end of the arm.

2. In a dolly, a frame, a caster type steering wheel having a wheel fork with an upright spindle thereon rotatably mounted in said frame, a sector plate fixed on said frame and through which said spindle is rotatably extended, a steering arm freely swingable on said spindle over said plate and having a hand-grip end provided with a spring pressed detent bar pivoted on said end for frictionally gripping said plate to lock said arm in differently swung positions, said arm being vertically slidable on said spindle in opposite directions, clutch parts on said spindle and arm, respectively, engaged and disengaged by sliding of said arm in opposite directions, respectively, for connecting and disconnecting said arm and spindle, spring means acting against said plate and arm for sliding said arm in a direction to disengage said clutch parts to free said spindle and steering wheel while said arm is locked, and a rotary member on said spindle engageable with said arm to slide the same in a direction to engage said clutch parts.

References Cited in the file of this patent

UNITED STATES PATENTS

| Number | Name | Date |
|---|---|---|
| 1,467,271 | Gutekunst | Sept. 4, 1923 |
| 2,228,247 | Cunningham | Jan. 14, 1941 |
| 2,388,692 | House | Nov. 13, 1945 |

FOREIGN PATENTS

| Number | Country | Date |
|---|---|---|
| 463,510 | Great Britain | Apr. 1, 1937 |
| 747,874 | France | Apr. 4, 1933 |